(12) United States Patent
Buder et al.

(10) Patent No.: US 11,890,976 B2
(45) Date of Patent: Feb. 6, 2024

(54) DAMPED SHOCK-ABSORBING SEAT

(71) Applicant: Rheinmetall Protection Systems GmbH, Bonn (DE)

(72) Inventors: Francois Buder, Niederkassel/Reidt (DE); Michael Inden, Kerpen (DE); Rene Neuling, Hennef (DE)

(73) Assignee: Rheinmetall Protection Systems GmbH, Bonn (DE)

( * ) Notice: Subject to any disclaimer, the term of this patent is extended or adjusted under 35 U.S.C. 154(b) by 320 days.

(21) Appl. No.: 16/605,078

(22) PCT Filed: Apr. 13, 2018

(86) PCT No.: PCT/EP2018/059600
§ 371 (c)(1),
(2) Date: Oct. 14, 2019

(87) PCT Pub. No.: WO2018/189396
PCT Pub. Date: Oct. 18, 2018

(65) Prior Publication Data
US 2020/0391630 A1 Dec. 17, 2020

(30) Foreign Application Priority Data
Apr. 13, 2017 (DE) .......................... 102017108072.4

(51) Int. Cl.
*B60N 2/42* (2006.01)
*B60N 2/427* (2006.01)
(Continued)

(52) U.S. Cl.
CPC ......... *B60N 2/4235* (2013.01); *B60N 2/4242* (2013.01); *B60N 2/42709* (2013.01); *B60R 22/12* (2013.01); *B60R 22/28* (2013.01); *B60R 2022/027* (2013.01); *B60R 2022/283* (2013.01); *B60R 2022/286* (2013.01)

(58) Field of Classification Search
CPC .......................... B60N 2/4235; B60N 2/4242; B60N 2/42709; B60R 22/12; B60R 22/28; B60R 2022/027; B60R 2022/283; B60R 2022/286
See application file for complete search history.

(56) References Cited

U.S. PATENT DOCUMENTS 3,279,782 A * 10/1966 Schick .................. B60G 15/07
280/124.147
3,986,748 A * 10/1976 Magnuson ............. B60N 2/501
296/65.02
(Continued)

FOREIGN PATENT DOCUMENTS

DE 102008053152 A 4/2010
DE 102010020533 A 11/2011
(Continued)

*Primary Examiner* — Philip F Gabler
(74) *Attorney, Agent, or Firm* — Harness, Dickey & Pierce, P.L.C.

(57) ABSTRACT

A damping member (1) which has at least two engagement points (2), wherein the damping member (1) has an absorption means, wherein fastening elements (3) are arranged on the damping member (1), and wherein an additional absorption means (4) is provided which brings about shock absorption together with the absorption means.

6 Claims, 3 Drawing Sheets

(51) Int. Cl.
  B60R 22/12  (2006.01)
  B60R 22/28  (2006.01)
  B60R 22/02  (2006.01)

(56) References Cited

U.S. PATENT DOCUMENTS

| | | | | |
|---|---|---|---|---|
| 7,293,818 | B2* | 11/2007 | Kumpf | B60N 2/015 |
| | | | | 296/68.1 |
| 7,758,095 | B2* | 7/2010 | Elhanany | B60N 2/4242 |
| | | | | 296/63 |
| 9,033,412 | B2* | 5/2015 | Reinck | B64D 11/0619 |
| | | | | 297/216.17 |
| 2012/0200128 | A1* | 8/2012 | Soliz | B60N 2/4242 |
| | | | | 297/216.17 |
| 2013/0033056 | A1* | 2/2013 | Tunis, III | A61G 3/006 |
| | | | | 296/64 |
| 2015/0231996 | A1* | 8/2015 | Ham | B60N 2/42736 |
| | | | | 297/344.1 |
| 2020/0386524 | A1* | 12/2020 | Buder | B60N 2/42709 |
| 2020/0391633 | A1* | 12/2020 | Buder | B60N 2/015 |

FOREIGN PATENT DOCUMENTS

| | | | |
|---|---|---|---|
| EP | 2650168 | A | 10/2013 |
| WO | 1997037876 | A | 10/1997 |

* cited by examiner

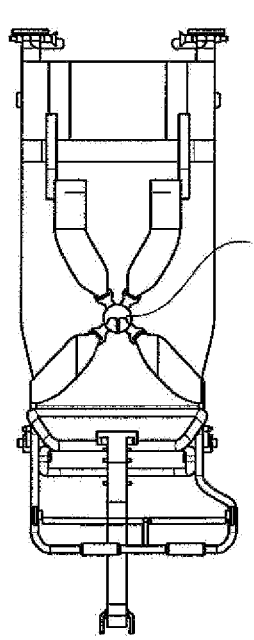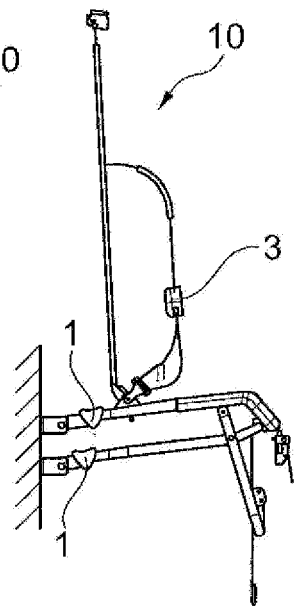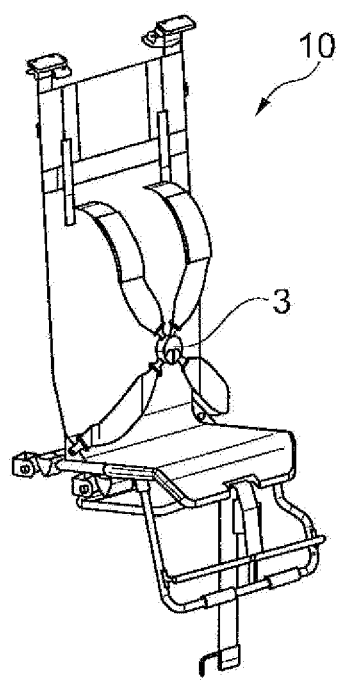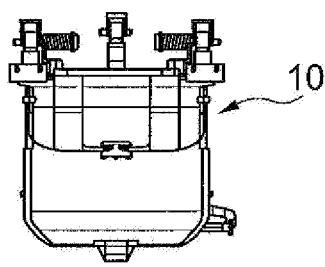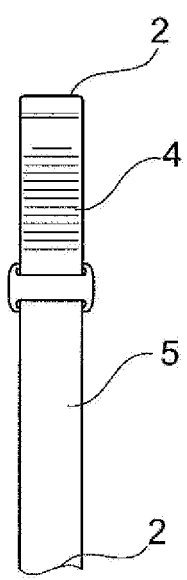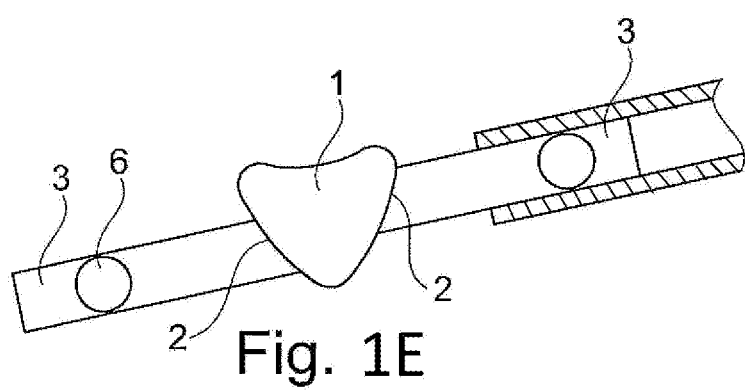

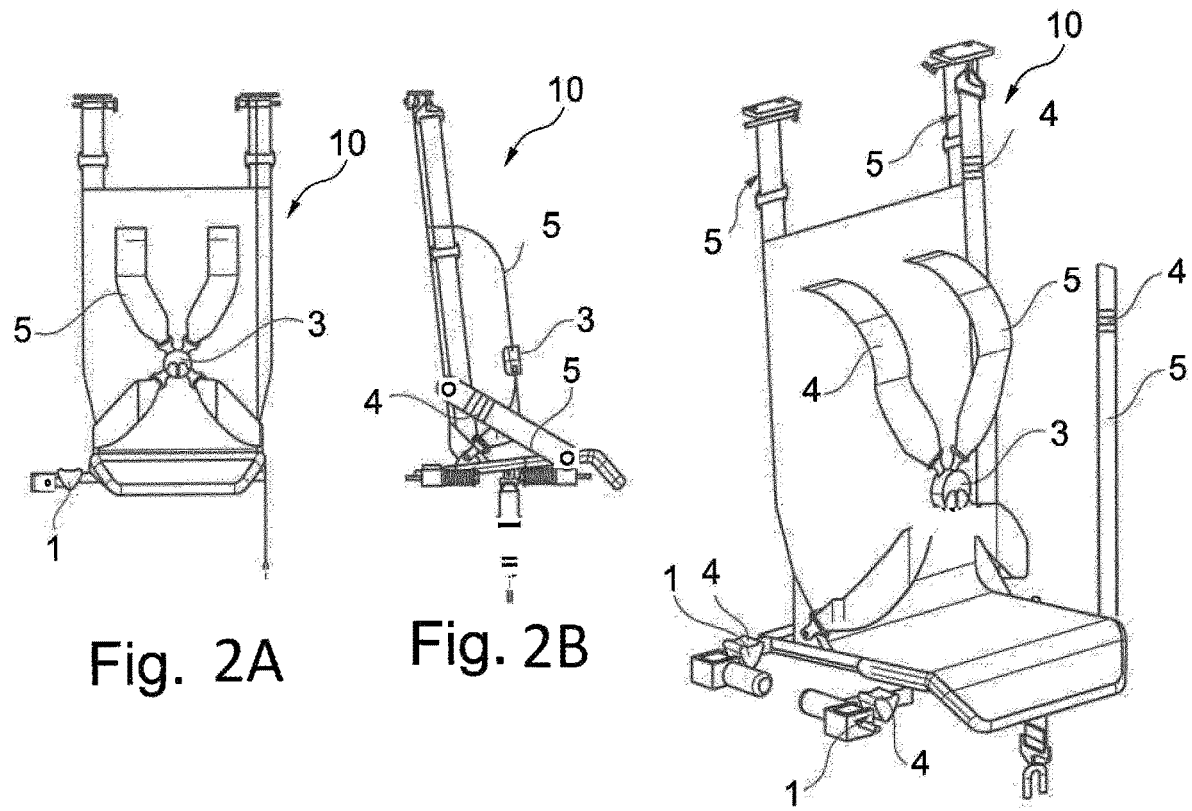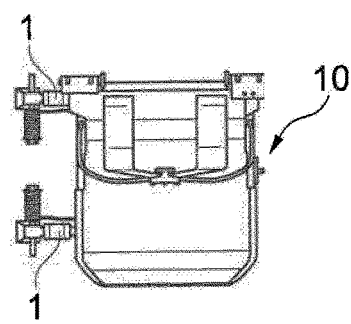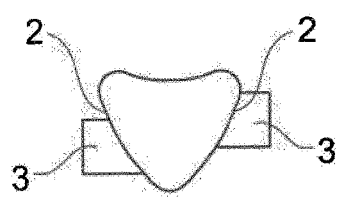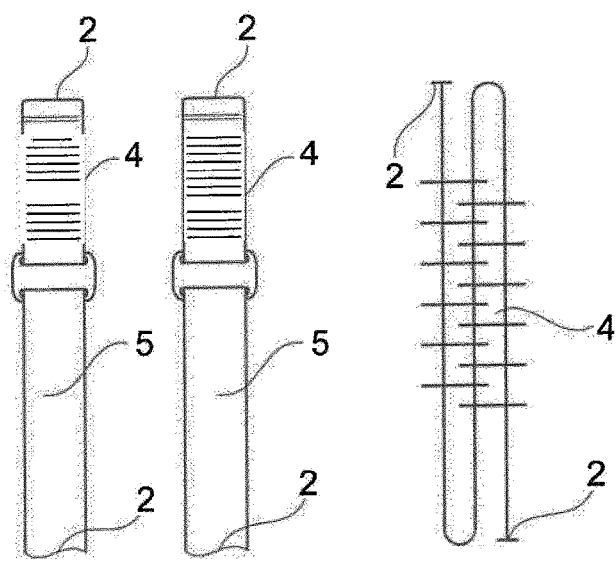

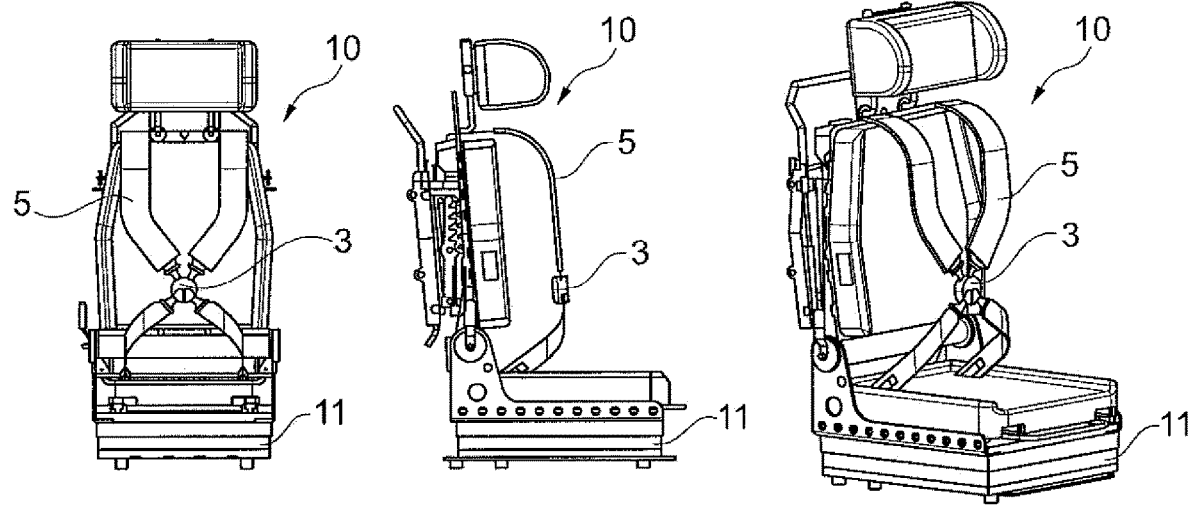
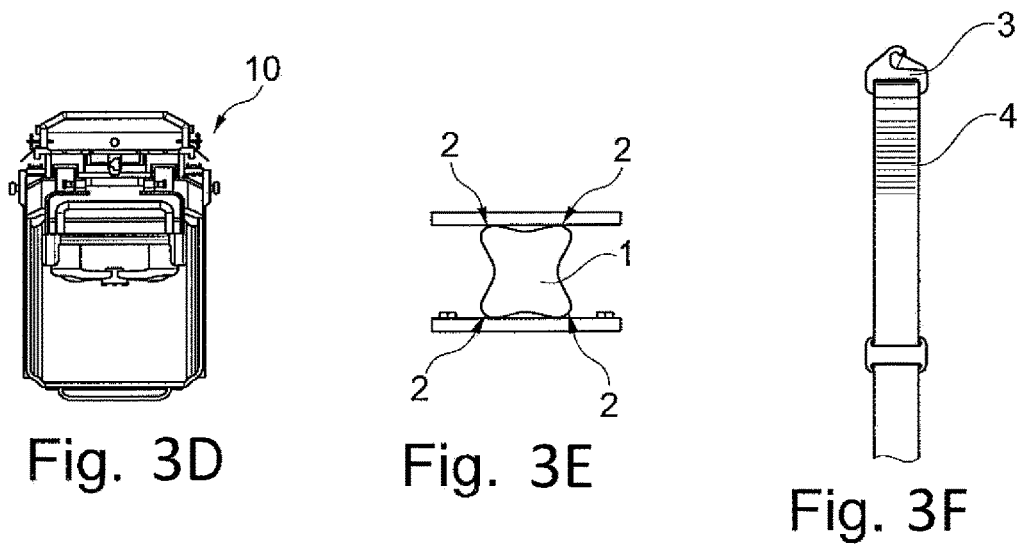
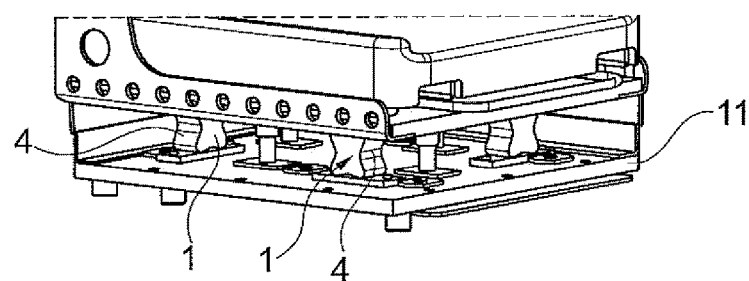

DAMPED SHOCK-ABSORBING SEAT

CROSS REFERENCE TO RELATED APPLICATIONS

This application is the US-national stage of PCT application PCT/EP2018/059600 filed 13 Apr. 2018 and claiming the priority of German patent application 102017108072.4 itself filed 13 Apr. 2017.

FIELD OF THE INVENTION

The invention relates to a shock-absorbing damping member and also to a seat for a land vehicle and that has at least one damping member according to the invention.

BACKGROUND OF THE INVENTION

Seats for land vehicles, in particular for military purposes and that have damping members in order to absorb shocks acting on the vehicle from the outside and therefore provide protection to the occupants sitting on these seats are known. Shocks acting on the vehicle from the outside are generally impacts from explosive materials, as are used for example in mines over which the vehicle drives.

DE 10 2008 053 152 discloses a deformation element for protecting a device, in particular a footrest plate in an, in particular, military vehicle where the deformation element is substantially U-shaped.

OBJECT OF THE INVENTION

The object of the invention is to provide a damping member that has improved shock absorption in comparison to conventional damping members. Another object of the invention is to provide a seat for a vehicle that protects its user against external impacts.

SUMMARY OF THE INVENTION

The invention proposes a damping member that has two attachment points in order to introduce forces, which occur in a pulsed manner, into the damping member.

The damping member further has fastening elements that anchor the damping member. The fastening points are preferably secured at attachment points, so that the action of force on the damping member can take place through the fastening elements.

In a particular embodiment, the fastening elements are tubes. These can then be mounted by insertion into existing tubes of a seat and/or of the chassis of a vehicle.

SPECIFIC DESCRIPTION OF THE INVENTION

As seen in FIG For the purpose of fixing the tubes, it is then proposed to provide holes in the tubes that are fixed by screw or plug connections.

Fixing in this way or design as a plug-connectable tube system has the advantage of quick exchangeability. Accordingly, the damping members can also be used as replacement parts.

The damping member according to the invention further has a shock absorber that is capable of absorbing introduced forces and in this way can damp the actions of force that occur in a pulsed manner.

A shock absorber of this kind can be a compressible substance or an elastic substance that returns to its initial position after action of force.

The invention provides an second shock absorber that can likewise absorb forces and therefore contributes to damping. The damping then takes place by cooperation between shock absorber and second shock absorber.

The second shock absorber absorbs the exerted forces by deformation work. This means that the second shock absorber is deformed during the action of force. However, a deformation of this kind does not occur in the event of conventional loading and/or action of force on the damping member. Said loading or action of force is converted into deformation work only when a certain force is exceeded. As a result, the shape is retained in the event of normal loading of the damping member.

In a particular embodiment, the damping member has a housing that can have different shapes. It is proposed here to arrange shock absorber within the housing. The second shock absorber can then be the housing or a part of the housing.

In order to assist deformation of the housing or of parts of the housing, the parts of the housing that are intended to deform are provided with round shapes. Therefore, a heart or cloverleaf shape is preferably proposed for the housing since these shapes have proven particularly suitable for a corresponding deformation.

In a further embodiment, the damping member is a strap. In this case, the strap acts as a shock absorber owing to its physical properties. To this end, the strap is preferably provided with an elasticity and is of multilayered design at least in regions. In this case, the second shock absorber consists of seams that connect at least two layers of the strap to one another. The possible deformation work of the second shock absorber takes effect here owing to the separation of the seams in the event of action of force.

The seams of the strap are preferably mounted so as to run parallel to each other and transversely of the strap. This creates a number of seams that run parallel to each other and that run transversely of the strap at a distance from one another. In this case, the distances can be of identical or different design for all seams. These seams are provided on a strap at least in regions.

In this case, a strap according to the invention can be coupled to a seat and/or to the chassis by its attachment points. To this end, the strap can be arranged such that a person on the seat is protected or moving parts of the seat are damped. For example, the strap can be coupled to the sitting surface and the backrest of the seat in order to damp a foldable sitting surface. In the event of an exemplary action of force from below, the force is then exerted on the seat. If the seat has a moving or foldable sitting surface, an upward movement of the sitting surface can be damped by the inertia of the person on the seat when a damping member according to the invention is a strap and is coupled to the sitting surface and the seat backrest. Similarly, connection in an articulated manner to the sitting surface and the chassis is conceivable for this purpose.

For the purpose of improved force absorption, the invention further preferably proposes arranging the attachment points offset relative to each other, so that they are not in alignment. This has the advantage that, in the event of an action of force at the attachment points, the fastening elements can move toward the damping member, without impeding one another.

The damping members are designed such that they can be used in a vehicle in order to cushion a vehicle seat against impact forces that are exerted on the seat. To this end, it is proposed to arrange at least one damping member according to the invention on the seat of the vehicle. Similarly, the movement of a person in the seat can be damped by the damping members.

The seat can be damped by at least one damping member being provided between the seat and the vehicle chassis. Similarly, the seat can also be equipped with corresponding straps. A combination of the above-described arrangements is also conceivable.

BRIEF DESCRIPTION OF THE DRAWING

Further features of the present invention are shown in the figures, in which:

FIGS. 1A-D show a seat according to the invention having damping members and a rear-side suspension arrangement FIG. 1A is a front view of the seat;
FIG. 1B is a side view of the seat;
FIG. 1C is a perspective view of the seat;
FIG. 1D is a top view of the seat;
FIG. 1E shows a damping member according to the invention in the shape of a heart;
FIG. 1F shows a damping member according to the invention in the form of a strap;
FIGS. 2A-D show a seat according to the invention having damping members and a lateral suspension arrangement;
FIG. 2A is a front view of the seat;
FIG. 2B is a side view of the seat;
FIG. 2C is a perspective view of the seat;
FIG. 2D is a top view of the seat;
FIG. 2E is a damping member according to the invention in the shape of a heart;
FIG. 2F is a damping member according to the invention in the form of a strap;
FIG. 2G shows seams on a damping member according to the invention in the form of a strap;
FIGS. 3A-D show a seat according to the invention having damping members and mounted on the chassis of a vehicle;
FIG. 3A is a front view of the seat;
FIG. 3B is a side view of the seat;
FIG. 3C is a perspective view of the seat;
FIG. 3D is a top view of the seat;
FIG. 3E shows a damping member according to the invention in the shape of a cloverleaf;
FIG. 3F shows a damping member according to the invention in the form of a strap;
FIG. 3G shows damping members between the seat and the chassis.

SPECIFIC DESCRIPTION OF THE INVENTION

FIGS. 1A-E show a damping member 1 that has a housing and is designed approximately in a heart shape when viewed from the side. A fastening element 3 is secured at attachment points 2 on each side of the heart-shaped damping member 1.

The fastening elements 3 are each preferably tubular. The longitudinal axes of the two tubes are vertically offset relative to each other. The damping member 1 that is of heart-shaped cross section is formed by sheet metal that surrounds the narrower outer sides and on which the tubes are mounted, in particular welded. The interior of the heart-shaped damping member 1 is filled with an elastically deformable material that constitutes a shock absorber.

The two tube ends that project from the heart-shaped damping member 1 connect the chassis of the seat 10 to a chassis 11 of the vehicle. The tubes could likewise be inserted into existing tubes of the seat and/or of the chassis in a plug connection. To this end, fixing of the plug connection is rendered possible by holes 6 in the tubes that are provided for this purpose. A connection of this kind is shown for example in FIG. 1E.

If the vehicle is impacted from the outside, the heart-shaped damping member 1 according to the invention allows the energy of the impact to be absorbed both by plastic deformation of the outer heart-shaped metal sheet (second shock absorber 4) and also by the elastically deformable material (shock absorber) inside the sheet metal in order to reduce the energy of the impact.

Deformation is ensured by the two longitudinal axes of the two fastening tubes not being in alignment, but rather vertically offset relative to each other. This permits the heart-shaped damping member 1 to be telescoped to reduce the deformation energy and therefore considerably attenuate the impact acting from the outside, so that the person sitting on the seat 10 is very well protected against this external influence.

In a further refinement, the damping member 1 is integrated into a strap 5. The person sitting on the seat 10 can strap himself in using a strap 5 of this kind, but straps can also be connected to the seat 10 and/or to the chassis of a vehicle in order to damp movement of parts of the seat 10. Provision is made is here for at least two layers of the strap material to be arranged substantially congruently one on the other in the region where the strap 5 forms the damping member 1.

A plurality of seam lines that connect the two layers of strap material, which are mounted substantially so as to coextensively cover one another, to one another extend transversely to the longitudinal extent of the strap 5 at spacings from one another. Moreover, the strap 5 is usually connected first to the seat 10 and second to the chassis 11 or to the seat once again. To this end, the fastenings of the straps 5 form the fastening elements 3 of the damping member 1 and the ends of the strap 5 form the attachment points 2.

The plurality of seam lines that extend parallel to each other and one after the other longitudinally of the strap 5 create predetermined tear points since the seams rupture in succession as a consequence of the impact from the outside and in this way reduce the energy of the impact. During normal operation of the vehicle, these seam lines that extend to each other are dimensioned such that they do not normally tear below a maximum loading with which the seat 10 may be loaded.

FIG. 2G shows a possible seam arrangement for a damping member 1 according to the invention in the form of a strap 5. The seams that run parallel to each other and transversely of the strap 5 here connect two layers of the strap 5. The strap 5 itself is multilayered in the region of the seams. They can be loops that the strap 5 forms in the region of the seams, but the strap 5 can also form the multilayered region by a plurality of strap pieces being laid one over the other in an overlapping manner.

In the event of action of force on the strap at the attachment points 2, a shear force is then exerted on the seams that can separate as a result and effect the damping of the damping member 1. As shown, the seams can each connect two layers, but they can also be continuous through all layers. In this case, the different seams can be formed from different materials with different tear characteristics.

The strap is designed such that the damping member is not activated under normal conditions or forces. The damping member becomes active only above a certain load limit.

FIGS. 1A-F show a seat of a vehicle that is connected to the seat 10 by the heart-shaped damping member 1 by tubes or the like that are mounted on it. Second, the damping member 1 is likewise connected to a chassis 11, not illustrated, of a vehicle by tubes or the like. The illustrated seat 10 is also equipped with the damping member 1 that is integrated in the strap 5. In this illustration, the back of the seat 10 is secured to the chassis 11 of the vehicle via of the heart-shaped damping members 1.

FIGS. 2A-G likewise show that the heart-shaped damping member 1 and also the damping member 1 integrated in the strap 5 are used as damping members 1. However, in this refinement, the seat 10 is not mounted and fastened in the vehicle at the rear side, but rather laterally at a suitable point, by the heart-shaped damping members 1.

FIG. 2B shows a particularly preferred arrangement of the damping members 1 that are incorporated in the strap 5. In this case, the strap 5 is coupled to the seat 10 at each of its attachment points 2, and one end of the strap 5 is coupled to the backrest of the seat and the other end of the strap 5 is coupled to the seat 10. As a result, the seat 10 can be damped in the event of an action of force on the vehicle if the sitting surface of the seat 10 is movable, for example foldable.

Both types of damping members 1 are likewise used in FIGS. 3A-G, wherein a cloverleaf-shaped, not heart-shaped, damping member 1 is used. This at least one cloverleaf-shaped damping member 1 is provided between a chassis 11 of the vehicle, for example a floor plate, and a chassis of the seat 10, for example an underside of the sitting surface.

As an alternative to the above-described heart-shaped cross section of the damping member 1, a cloverleaf-shaped cross section also comes into consideration, as shown in FIGS. 3A-G. A cloverleaf-shaped cross section of this kind of the damping member 1 is then used when provided for example between the chassis 11 of the vehicle and the chassis of the seat, so that the fastening tubes that are required in the case of the heart-shaped damping member 1 can be, but do not have to be, dispensed with. Even in the case of a cloverleaf-shaped damping member 1, tubes can be used in order therefore to arrange and to fasten the damping member 1 at its installation location.

The invention is not restricted to the above-described features. Rather, further refinements are possible. For example, the second absorption element can be a sleeve around the absorption element. A housing can then also be arranged around the two damping elements. Plug connections at the attachment points and/or fastening elements are likewise possible in order to facilitate easy replacement of the damping members.

The invention claimed is:

1. A system for a vehicle having a vehicle chassis, the system comprising:
   a seat having a backrest and a sitting surface coupled to the backrest; and
   at least one damping member configured to connect the seat to a portion of the vehicle chassis and extending from the sitting surface of the seat and positioned between the seat and the portion of the vehicle chassis for damping the seat, the at least one damping member defined by an outer periphery having a heart shape or a cloverleaf shape,
   wherein the heart-shaped outer periphery is defined by a vertex, two opposing rounded corners, a first convex side extending between the vertex and one of the rounded corners, a second convex side extending between the vertex and the other rounded corner, and a concave side extending between the two opposing rounded corners, wherein an acute angle is formed between the first convex side, the second convex side, and the vertex,
   wherein the cloverleaf-shaped outer periphery is defined by four rounded corners and a concave side extending between each adjacent pair of the four rounded corners,
   wherein the at least one damping member is configured to deform in the event of an action of force on the damping member, and
   wherein the at least one damping member is configured to provide shock absorption.

2. The system according to claim 1, further comprising a strap coupled to the seat, the strap including a strap damping member, wherein:
   the strap is arranged such that moving parts of the seat are damped;
   the strap damping member includes seams that connect at least two layers of the strap to one another;
   the seams are configured to separate in the event of an action of force on the strap; and
   the at least one heart-shaped or cloverleaf-shaped damping member together with the strap damping member provide shock absorption.

3. The system according to claim 1, wherein:
   the at least one damping member includes at least two attachment points for introducing forces into the at least one damping member; and
   the at least two attachment points are offset from one another and not in alignment with one another.

4. The system according to claim 1, wherein a shape of the at least one damping member is retained in the event of normal loading of the at least one damping member.

5. The system according to claim 1, wherein the at least one damping member is formed of metal.

6. The system according to claim 5, wherein the at least one damping member is filled with elastically deformable material.

\* \* \* \* \*